United States Patent
Han (10) Patent No.: US 10,539,710 B2
(45) Date of Patent: Jan. 21, 2020

(54) PROXIMITY SENSOR, CAMERA MODULE COMPRISING SAME, AND MOBILE TERMINAL COMPRISING SAME

(71) Applicant: LG INNOTEK CO., LTD., Seoul (KR)

(72) Inventor: Kyung Ha Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 18 days.

(21) Appl. No.: 15/553,017

(22) PCT Filed: Feb. 24, 2016

(86) PCT No.: PCT/KR2016/001779
§ 371 (c)(1),
(2) Date: Aug. 23, 2017

(87) PCT Pub. No.: WO2016/137214
PCT Pub. Date: Sep. 1, 2016

(65) Prior Publication Data
US 2018/0031728 A1 Feb. 1, 2018

(30) Foreign Application Priority Data
Feb. 24, 2015 (KR) .................. 10-2015-0025900

(51) Int. Cl.
*G01V 8/14* (2006.01)
(52) U.S. Cl.
CPC ..................... *G01V 8/14* (2013.01)
(58) Field of Classification Search
CPC combination set(s) only.
See application file for complete search history.

(56) References Cited

U.S. PATENT DOCUMENTS 7,309,855 B2 * 12/2007 Nagasaka .............. G01D 5/305
250/231.14
7,385,178 B2 * 6/2008 Chin .................. G01D 5/34715
250/231.13
(Continued)

FOREIGN PATENT DOCUMENTS

KR 10-2006-0126172 A 12/2006
KR 10-2010-0081052 A 7/2010
(Continued)

OTHER PUBLICATIONS

International Search Report in International Application No. PCT/KR2016/001779, filed Feb. 24, 2016.

*Primary Examiner* — Christine S. Kim
(74) *Attorney, Agent, or Firm* — Saliwanchik, Lloyd & Eisenschenk (57) ABSTRACT

One embodiment relates to a proximity sensor, a camera module comprising same, and a mobile terminal comprising same and comprises: a housing; a substrate disposed inside the housing; a sound output unit mounted on the substrate; a display unit disposed on the upper side of the housing; a camera module comprising a proximity sensor, which comprises a light-emitting unit and a light-receiving unit and detects the proximity of a user to the display unit at a predetermined distance by having the light-emitting unit and the light-receiving unit disposed at either side of the sound output unit, and a control unit for receiving the amount of light emitted by the light-emitting unit and the amount of light received by the light-receiving unit as inputs from the proximity sensor so as to operate the display unit; and a cover unit disposed on the display unit and provided over the sound output unit and the proximity sensor.

13 Claims, 6 Drawing Sheets

(56) References Cited

U.S. PATENT DOCUMENTS

| | | | |
|---|---|---|---|
| 8,548,541 B2 | 10/2013 | Rayner | |
| 8,937,377 B2* | 1/2015 | Yao | G01S 7/4813 257/676 |
| 9,599,745 B2* | 3/2017 | Hsu | G01V 8/12 |
| 9,632,209 B2* | 4/2017 | Kwangkaew | G01V 8/12 |
| 2006/0016994 A1* | 1/2006 | Basoor | G01V 8/12 250/338.1 |
| 2006/0237540 A1* | 10/2006 | Saxena | G06K 7/10732 235/454 |
| 2008/0219673 A1* | 9/2008 | Goh | H04B 10/40 398/135 |
| 2009/0027652 A1* | 1/2009 | Chang | G01C 3/08 356/4.01 |
| 2009/0159900 A1* | 6/2009 | Basoor | G01S 7/4813 257/82 |
| 2010/0181578 A1* | 7/2010 | Li | H01L 31/0203 257/82 |
| 2010/0230599 A1* | 9/2010 | Yamaguchi | G01S 7/4813 250/351 |
| 2010/0258712 A1* | 10/2010 | Wiese | H01L 25/167 250/237 R |
| 2010/0327164 A1* | 12/2010 | Costello | G01D 5/34715 250/338.1 |
| 2012/0086018 A1* | 4/2012 | Yao | G01S 7/4813 257/82 |
| 2012/0223231 A1* | 9/2012 | Nijaguna | G01J 1/0214 250/338.1 |
| 2013/0265771 A1* | 10/2013 | Flores | C08K 5/42 362/296.02 |
| 2014/0070080 A1* | 3/2014 | Ruh | G01S 7/4813 250/216 |
| 2014/0097451 A1* | 4/2014 | Lin | H01L 25/50 257/82 |
| 2014/0252213 A1* | 9/2014 | Ruh | H01L 31/125 250/227.11 |
| 2015/0028357 A1* | 1/2015 | Tu | H01L 25/167 257/82 |
| 2016/0041029 A1* | 2/2016 | T'Ng | G01J 1/0214 250/239 |
| 2017/0052277 A1* | 2/2017 | Wong | G01V 8/12 |
| 2018/0164409 A1* | 6/2018 | Chen | G01J 1/02 |
| 2018/0188105 A1* | 7/2018 | Huang | G01J 1/0214 |

FOREIGN PATENT DOCUMENTS

| | | |
|---|---|---|
| KR | 10-2010-0108936 A | 10/2010 |
| KR | 10-2012-0021608 A | 3/2012 |
| KR | 10-2013-0015485 A | 2/2013 |
| KR | 10-2013-0082368 A | 7/2013 |
| KR | 2014-0122589 A | 10/2014 |

* cited by examiner

PROXIMITY SENSOR, CAMERA MODULE COMPRISING SAME, AND MOBILE TERMINAL COMPRISING SAME

CROSS-REFERENCE TO RELATED APPLICATIONS

This application is the U.S. national stage application of International Patent Application No. PCT/KR2016/001779, filed Feb. 24, 2016, which claims priority to Korean Application No. 10-2015-0025900, filed Feb. 24, 2015, the disclosures of each of which are incorporated herein by reference in their entirety.

TECHNICAL FIELD

Embodiments relate to a proximity sensor, a camera module including the same, and a mobile terminal including the same, and more particularly to a proximity sensor, which may prevent crosstalk by disposing a light-emitting unit and a light-receiving unit of a proximity sensor at respective opposite sides of a sound output unit, and which may achieve an increase in the amount of light emitted from the light-emitting unit and the amount of light received by the light-receiving unit, a camera module including the same, and a mobile terminal including the same.

BACKGROUND ART

Among portable mobile terminals, a smart phone is a device to which computer-replacing functions, such as for example Internet communication and information retrieval, are added, in addition to a cellular phone function. The use of the smart phone has rapidly increased and has come to be commonly used in recent years, owing to the functions and convenience thereof.

In addition, the smart phone may be used as a portable computer, in addition to being used as a portable phone, and enables, for example, Internet communication and facsimile transmission while moving.

The most important feature of such a smart phone is to allow a user to install or delete hundreds of various applications as the user wishes, unlike conventional cellular phones, which were released as finished products and perform only given functions.

Meanwhile, a mobile terminal such as a smart phone is equipped with a proximity sensor, which senses the approach of a specific body part such as the user's hand or a specific object. The proximity sensor may include a transmitter that transmits infrared light and a receiver that senses reflected infrared light, thereby sensing the approach of a person, an object or the like.

In addition, a conventional proximity sensor is configured such that a proximity sensor unit and a printed black band layer for preventing infrared light reflection and diffuse reflection are stacked one above another, and a glass cover is stacked thereon. Accordingly, a transparent window, i.e. a sensor window, on which the proximity sensor is mounted, generally appears black.

However, for example, although it does not matter that the sensor window appears black when a smart phone is manufactured in black, in the case of a white smart phone, the sensor window that appears black may mar the aesthetic design of the smart phone due to the difference in color from the rest of the terminal.

Therefore, although a white layer may be directly printed on a film layer disposed under the glass cover, in this case, reflection and diffuse reflection of light may occur, which prevents proper transmission and reception of infrared light, deteriorating the accuracy of sensing by the sensor.

In order to solve the problem described above, Korean Patent Laid-Open Publication No. 10-2014-0080256 discloses a portable terminal, which includes a terminal main body coupled at an upper surface thereof to a glass cover, a sensor unit mounted in the terminal main body to sense the external state of the terminal main body, and a sensor window mounted between the sensor unit and the glass cover, the sensor window appearing the same color as the terminal main body. With the conventional portable terminal described above, the sensor window, which is a transparent window of an infrared proximity sensor, may appear white using the scattering of light thereof. Accordingly, when the portable terminal has a bright color such as white, the aesthetic appearance of the portable terminal may be improved owing to the similarity of the colors of the portable terminal and the sensor window.

However, because a light-emitting unit and a light-receiving unit of the proximity sensor are located close to each other, crosstalk may occur due to internal diffuse reflection.

In addition, the sensor window stacked on the proximity sensor may reduce the amount of light emitted from the light-emitting unit and the amount of light received by the light-receiving unit.

Technical Object

Embodiments have been devised to solve the problems described above, and one object of the embodiments is to provide a proximity sensor, which is configured such that a light-emitting unit and a light-receiving unit thereof may be disposed respectively at opposite sides of a sound output unit, a camera module including the same, and a mobile terminal including the same.

In addition, another object of the embodiments is to provide a proximity sensor, which is configured such that light, which is emitted from a light source of a light-emitting unit, and light, which is introduced into a light-receiving unit of a proximity sensor, may pass through a cover unit for a sound output unit, a camera module including the same, and a mobile terminal including the same.

Technical Solution

To achieve the objects described above, one embodiment provides a proximity sensor including a substrate, a light-emitting unit and a light-receiving unit disposed on the substrate so as to be spaced apart from each other, a spacing maintainer disposed between the light-emitting unit and the light-receiving unit, a reflector having a first reflecting plane configured to refract light emitted from the light-emitting unit and a second reflecting plane configured to refract light introduced into the light-receiving unit, and a cover unit disposed above the light-emitting unit, the light-receiving unit and the spacing maintainer.

In the embodiment, the light-emitting unit may include a first body configured to support the light-emitting unit, an infrared light-emitting diode provided to face the first reflecting plane that is disposed on one side of the first body, and a first lens disposed in a first hole that is formed in an upper end surface of the first body.

In addition, a molding material may be disposed between the first body and a lower end surface of the first reflecting plane.

In addition, the substrate and the infrared light-emitting diode may be electrically connected to each other via a first wire disposed between the substrate and the infrared light-emitting diode, and the first wire may be coated with a light-transmissive resin.

In addition, the light-receiving unit may include a second body configured to support the light-receiving unit, a photodiode provided to face the second reflecting plane that is disposed on one side of the second body, and a second lens disposed in a second hole that is formed in an upper end surface of the second body.

In addition, a molding material may be disposed between the second body and a lower end surface of the second reflecting plane.

In addition, the substrate and the photodiode may be electrically connected to each other via a second wire disposed between the substrate and the photo diode, and the second wire may be coated with a light-transmissive resin.

In addition, the first reflecting plane and the second reflecting plane may have an inclination angle ranging from 35 degrees to 50 degrees relative to the substrate.

In addition, the first reflecting plane and the second reflecting plane may be formed of at least one of acryl and polycarbonate.

Another embodiment provides a camera module including a display unit, a proximity sensor configured to sense whether a user has approached the display unit within a predetermined distance, a photographing lens disposed close to the proximity sensor, and a controller configured to drive the display unit when receiving the amount of light emitted from a light-emitting unit and the amount of light received by a light-receiving unit from the proximity sensor.

In the embodiment, the controller may perform control to cause the display unit to be in a use state when the proximity sensor does not sense that the user has approached the display unit within the predetermined distance, and performs control to cause the display unit to be in a non-use state when the proximity sensor senses that the user has approached the display unit within the predetermined distance.

In addition, the camera module may further include an input unit to which whether or not the display unit is to be used is input, and the controller may perform switching of the display unit between the use state and the non-use state in response to an input to the input unit.

A further embodiment provides a mobile terminal including a housing, a substrate disposed inside the housing, a sound output unit seated on the substrate, a display unit disposed on an upper surface of the housing, a camera module including a proximity sensor, which includes a light-emitting unit and a light-receiving unit disposed at opposite sides of the sound output unit to sense whether a user has approached the display unit within a predetermined distance, and a controller, which is configured to drive the display unit when receiving the amount of light emitted from the light-emitting unit and the amount of light received by the light-receiving unit from the proximity sensor, and a cover unit disposed on the display unit so as to be provided above the sound output unit and the proximity sensor.

In the embodiment, the light-emitting unit may include a first body configured to support the light-emitting unit, an infrared light-emitting diode disposed on an inner lower end surface of the first body, and a first lens disposed in a first hole that is formed in an upper end surface of the first body.

In addition, the light-receiving unit may include a second body configured to support the light-receiving unit, a photodiode disposed on an inner lower end surface of the second body, and a second lens disposed in a second hole that is formed in an upper end surface of the second body.

Meanwhile, the proximity sensor may include a first reflecting plane configured to refract light emitted from the light-emitting unit and a second reflecting plane configured to refract light introduced into the light-receiving unit.

In addition, the light-emitting unit may include a first body configured to support the light-emitting unit, an infrared light-emitting diode provided to face the first reflecting plane that is disposed on one side of the first body, and a first lens disposed in a first hole that is formed in an upper end surface of the first body.

In addition, the light-receiving unit may include a second body configured to support the light-receiving unit, a photodiode provided to face the second reflecting plane that is disposed on one side of the second body, and a second lens disposed in a second hole that is formed in an upper end surface of the second body.

In addition, the cover unit may be provided to correspond to a longitudinal direction in which the sound output unit and the proximity sensor are arranged.

In addition, the cover unit may have a lattice hole.

Advantageous Effects

With the embodiments described above, a light-emitting unit and a light-receiving unit of a proximity sensor may be disposed respectively at opposite sides of a sound output unit, which may prevent crosstalk.

In addition, the amount of light emitted from the proximity sensor and the amount of light received by the proximity sensor may be increased by allowing light, which is emitted from a light source of the light-emitting unit, and light, which is introduced to the light-receiving unit of the proximity sensor, to pass through a cover unit for the sound output unit, which may increase the performance of the proximity sensor.

BEST MODE

Hereinafter, exemplary embodiments will be described in detail with reference to the accompanying drawings, in order to concretely realize the object described above.

Figure 1:
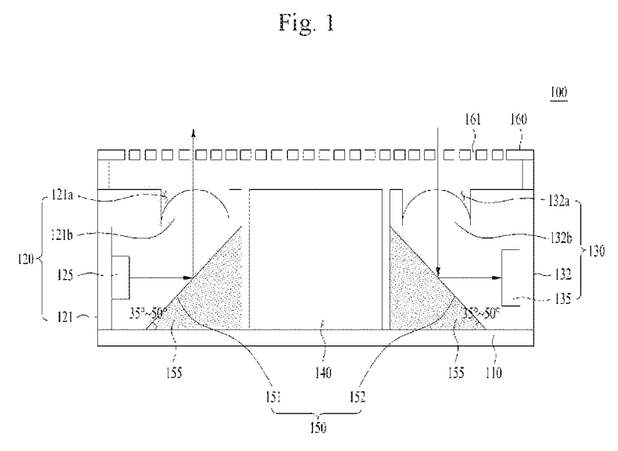
FIG. 1 is a cross-sectional view illustrating the configuration of a proximity sensor according to an embodiment.

FIG. 1 is a cross-sectional view illustrating the configuration of a proximity sensor according to an embodiment.

Referring to FIG. 1, the proximity sensor 100 according to the present embodiment includes a substrate 110, a light-emitting unit 120, a light-receiving unit 130, a spacing maintainer 140, a reflector 150, and a cover unit 160.

The proximity sensor 100 includes the light-emitting unit 120 and the light-receiving unit 130 so as to sense whether or not an external object closely approaches based on light reflected from the external object. The light-emitting unit 120 may emit light in order to sense whether or not the external object closely approaches, and the light-receiving unit 130 may receive the light emitted from the light-emitting unit 120 when the light is reflected from the external object, thereby sensing whether or not the external object closely approaches.

In addition, the proximity sensor 100 may use an infrared sensor, which senses, using infrared light, whether or not an external object closely approaches beyond a predetermined distance. Here, the light-emitting unit 120 of the proximity sensor 100 may include an infrared light-emitting diode that emits infrared light, and the light-receiving unit 130 may include a photodiode that converts light into electricity.

The substrate 110 may be configured with a flexible printed circuit board (FPCB) on which a pattern is printed, in order to enable a surface mounting technology (SMT) process.

In addition, the light-emitting unit 120 and the light-receiving unit 130 may be disposed on the substrate 110 so as to be spaced apart from each other. The spacing maintainer 140 may be disposed between the light-emitting unit 120 and the light-receiving unit 130. In addition, the reflector 150 may be provided on the light-emitting unit 120 and the light-receiving unit 130. The reflector 150 may include a first reflecting plane 151, which is disposed on the light-emitting unit 120 to refract the light emitted from the light-emitting unit 120 toward the cover unit 160, which will be described below, and a second reflecting plane 152, which is disposed on the light-receiving unit 130 to refract the light introduced into the light-receiving unit 130 after passing through the cover unit 160.

The light-emitting unit 120 may include a first body 121 configured to support the light-emitting unit 120, an infrared light-emitting diode 125, and a first lens 121b.

In addition, a portion of the first body 121 is filled with a molding material 155. The molding material 155 may be located between the first body 121 and the lower end surface of the first reflecting plane 151. In addition, the molding material 155 may be disposed to support the first reflecting plane 151 and may fill the inside of the first body 121 so as to form a slope. Here, the first reflecting plane 151 may be provided along the slope. As such, the infrared light-emitting diode 125 may be die-bonded to the inner side surface of the first body 121 so as to face the first reflecting plane 151 disposed on one side of the first body 121.

In addition, because the substrate 110 extends to the inner side surface of the first body 121 on which the infrared light-emitting diode 125 is disposed, the substrate 110 and the infrared light-emitting diode 125 may be electrically connected to each other.

In addition, a first hole 121a may be formed in the upper end surface of the first body 121, and the first lens 121b may be inserted into the first hole 121a to control the angle of emission of light.

The light-receiving unit 130 may include a second body 132 configured to support the light-receiving unit 130, a photodiode 135, and a second lens 132b.

In addition, a portion of the second body 132 may be filled with the molding material 155. The molding material 155 may be located between the second body 132 and the lower end surface of the second reflecting plane 152. In addition, the molding material 155 may be disposed to support the second reflecting plane 152 and may fill the inside of the second body 132 so as to form a slope. Here, the second reflecting plane 152 may be provided along the slope. As such, the photodiode 135 may be die-bonded to the inner side surface of the second body 132 so as to face the second reflecting plane 152 disposed on one side of the second body 132.

In addition, because the substrate 110 extends to the inner side surface of the second body 132 on which the photodiode 135 is disposed, the substrate 110 and the photodiode 135 may be electrically connected to each other.

In addition, a second hole 132a may be formed in the upper end surface of the second body 132, and the second lens 132b may be inserted into the second hole 132a to control the angle of incidence of light.

Meanwhile, in order to electrically connect each of the infrared light-emitting diode 125 and the photodiode 135, which are mounted respectively in the light-emitting unit 120 and the light-receiving unit 130, to the substrate 110, a first wire (not illustrated) may be disposed between the substrate 110 and the infrared light-emitting diode 125 and a second wire (not illustrated) may be disposed between the substrate 110 and the photodiode 135. In addition, in order to protect the first and second wires from the heat generated from the light-emitting unit or surrounding light, the first and second wires may be coated with a light-transmissive resin having good heat resistance and light resistance.

In addition, the first reflecting plane 151 may collect light from the infrared light-emitting diode 125, which is disposed on the side surface of the first body 121, to the top of the light-emitting unit 120, and may adjust the angle at which light spreads. In addition, the second reflecting plane 152 may collect light to the photodiode 135, which is disposed on the side surface of the second body 132, and may adjust the angle at which light spreads.

As described above, in order to increase the amount of light emitted from the infrared light-emitting diode 125 and the amount of light introduced into the photodiode 135, the first reflecting plane 151 and the second reflecting plane 152 may have an inclination angle ranging from 35 degrees to 50 degrees relative to the substrate 110. However, the inclination angle of the first reflecting plane 151 and the second reflecting plane 152 may be changed based on the shape and size of the first body 121 and the second body 132 and the positions at which the infrared light-emitting diode 125 and the photodiode 135 are disposed.

In addition, although the first reflecting plane 151 and the second reflecting plane 152 may be formed of at least one of acryl and polycarbonate, they may be formed of any other material capable of reflecting light such as, for example, a reflective metal such as gold (Au) or reinforced glass.

A conventional proximity sensor may include a substrate, a light-emitting unit, a light-receiving unit, isolators, and a cover unit, the light-emitting unit may include an infrared light-emitting diode and a first lens, and the light-receiving unit may include a photodiode and a second lens.

In addition, the light-emitting unit and the light-receiving unit are separately disposed on a substrate, and the isolators respectively having holes corresponding to the first lens and the second lens are provided on the edges of the light-emitting unit and the light-receiving unit.

In addition, the cover unit, which is formed of a transparent material, is disposed above the isolators, and a black coating layer is further provided on the lower end surface of the cover unit to prevent the proximity sensor from being visible from the outside.

In the conventional proximity sensor described above, due to the configuration in which the light-emitting unit and the light-receiving unit are disposed close to each other, some of the light emitted from the infrared light-emitting diode permeates into the region in which the photodiode is located due to internal diffuse reflection. Thereby, a signal that erroneously indicates that an external object closely approaches may be generated, causing malfunction of the proximity sensor. In addition, due to the black coating layer, which is provided to prevent the inside of the proximity sensor from being visible, the amount of light emitted from the light-emitting unit and the amount of light received by the light-receiving unit may be reduced.

As illustrated in FIG. 1, the proximity sensor according to the embodiment includes the spacing maintainer 140 provided between the light-emitting unit 120 and the light-receiving unit 130 to allow the light-emitting unit 120 and the light-receiving unit 130 to be spaced apart from each other by a predetermined distance, thereby minimizing or preventing the direct introduction of light from the light-emitting unit 120 to the light-receiving unit 130.

Here, the width of the spacing maintainer 140 may be determined such that a sufficient distance is maintained between the light-emitting unit 120 and the light-receiving unit 130 to prevent the light from the light-emitting unit 120 from being directly introduced into the light-receiving unit 130 due to internal diffuse reflection.

In addition, the cover unit 160 may be disposed above the light-emitting unit 120, the light-receiving unit 130 and the spacing maintainer 140. The cover unit 160 may have a lattice hole 161 to allow the light emitted from the light-emitting unit 120 and the light introduced into the light-receiving unit 130 to pass through the lattice hole 161. Accordingly, the amount of light emitted from the light-emitting unit 120 and the amount of light received by the light-receiving unit 130 may be increased compared to the case of the conventional proximity sensor.

Figure 2:
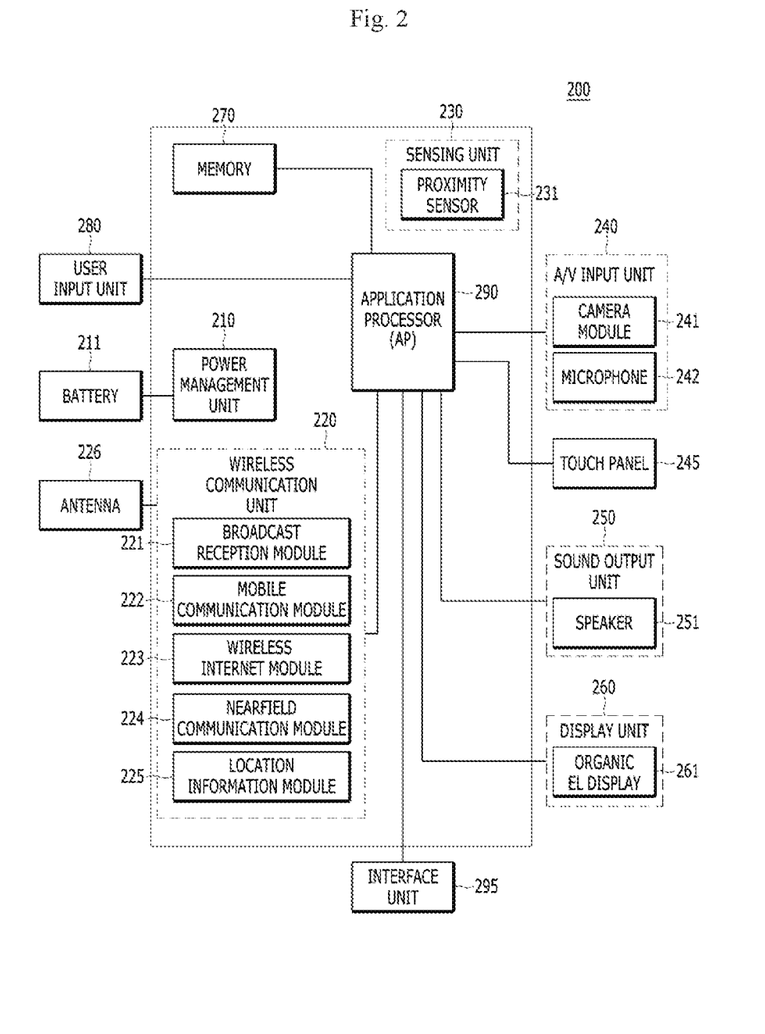
FIG. 2 is a block diagram of a mobile terminal according to an embodiment.

FIG. 2 is a block diagram of a mobile terminal according to an embodiment.

Referring to FIG. 2, the mobile terminal 200 may include a power management unit 210, a wireless communication unit 220, a sensing unit 230, an audio/video (A/V) input unit 240, a sound output unit 250, a display unit 260, a memory 270, a user input unit 280, an application processor (AP) 290, and an interface unit 295.

The aforementioned components may be not necessary, and the mobile terminal may be realized using a greater or smaller number of components than the aforementioned components. Hereinafter, the aforementioned components will be described in more detail.

The power management unit 210 generates internal electric power from a battery 211 or an external power supply. The internal electric power is applied to each block of the mobile terminal 200. Here, the power management unit 210 controls the internal electric power to be supplied to each block based on an instruction of the application processor (AP) 290, which will be described below. In addition, the power management unit 210 controls the charging of the battery 211 when electric power is supplied from an external power supply.

In addition, the battery 211 is a cell and is used when the mobile terminal 200 operates without following an external power supply. In addition, the mobile terminal 200 may use electric power of the battery 211 even when it is connected to an external power supply, and the battery 211 may use a secondary cell.

The wireless communication unit 220 may include one or more modules, which enable wireless communication between the mobile terminal 200 and a wireless communication system or between the mobile terminal 200 and a network in which the mobile terminal 200 is located. For example, the wireless communication unit 220 may include a broadcast reception module 221, a mobile communication module 222, a wireless Internet module 223, a nearfield communication module 224, and a location information module 225.

The broadcast reception module 221 receives broadcasting signals and/or broadcasting-related information from an external broadcast management server through a broadcast channel. Here, the broadcast channel may include a satellite channel or a terrestrial channel. In addition, the broadcast management server may mean a server that generates and transmits broadcasting signals and/or broadcasting-related information, or a server that receives previously generated broadcasting signals and/or broadcasting-related information and transmits the same to a terminal. In addition, the broadcasting signals may include TV broadcasting signals, radio broadcasting signals, data broadcasting signals, and combined broadcasting signals including TV broadcasting signals or radio broadcasting signals together with data broadcasting signals. In addition, broadcasting-related information may mean information regarding broadcast channels, broadcasting programs, or broadcasting service providers.

Meanwhile, the broadcasting-related information may be provided through a mobile communication network. In this case, the broadcasting-related information may be received by the mobile communication module 222. In addition, the broadcasting-related information may be present in various forms. For example, the broadcasting-related information may be present in the form of, for example, an electronic program guide (EPG) of digital multimedia broadcasting (DMB) or an electronic service guide (ESG) of digital video broadcast handheld (DVB-H).

In addition, the broadcast reception module 221 may receive digital broadcasting signals using a digital broadcast system such as, for example, a digital multimedia broadcasting terrestrial (DMB-T) system, a digital multimedia broadcasting satellite (DMBS) system, a media forward link only (FLO) system, a digital video broadcast handheld (DVB-H) system, or an integrated service digital broadcast terrestrial (ISDB-T) system. Of course, the broadcast reception module 221 may be configured so as to be suitable for other broadcast systems, in addition to the above-described digital broadcast systems.

In addition, the broadcasting signals and/or the broadcasting-related information, received via the broadcast reception module 221, may be stored in the memory 270.

Meanwhile, the mobile communication module 222 transmits and receives wireless signals to and from at least one of a base station, an external terminal, and a server in a mobile communication network. Here, the wireless signals may include various types of data depending on the transmission and reception of voice call signals, video call signals, or text/multimedia messages.

In addition, the wireless internet module 223 may refer to a module for wireless Internet connection, and may be mounted inside or outside the mobile terminal 200. As a Wireless Internet technology, for example, wireless LAN (WLAN) Wi-Fi, wireless broadband (WiBro), world interoperability for microwave access (WiMAX), or high-speed downlink packet access (HSDPA) may be used.

The nearfield communication module 224 refers to a module for nearfield communication. As a nearfield communication technology, for example, bluetooth, radio frequency identification (RFID), infrared data association (IrDA), ultra wideband (UWB), or Zigbee may be used.

In addition, the location information module 225 is a module for acquiring the location of the mobile terminal, and a representative example thereof may include a global positioning system (GPS) module.

In addition, the wireless communication unit 220 may include an antenna 226 and may receive signals between the mobile terminal and a wireless communication system or between the mobile terminal and a network in which the mobile terminal is located, and may transmit signals to the outside.

The sensing unit 230 generates sensing signals for controlling the operation of the mobile terminal 200 by sensing the current state of the mobile terminal 200, such as, for example, the opening/closing state of the mobile terminal 200, the location of the mobile terminal 200, whether or not a user touches the mobile terminal, the orientation of the mobile terminal, and the rapid or slow movement of the mobile terminal. For example, when the mobile terminal 200 is a slide-type phone, the sensing unit may sense whether the slide-type phone is opened or closed. In addition, the sensing unit may sense, for example, whether or not electric power is supplied by the power management unit 210 and whether or not an external device is coupled to the interface unit 295. Meanwhile, the sensing unit 230 may include, for example, a proximity sensor 231, a time-of-flight (TOF) sensor, an iris recognition sensor, a temperature sensor, or a global positioning system (GPS) sensor.

The audio/video (A/V) input unit 240 may serve to input audio signals or video signals, and may include a camera module 241 and a microphone 242. The camera module 241 processes an image frame such as a still image or a moving image acquired by an image sensor in a video call mode or a photographing mode. The processed image frame may be displayed on the display unit 260. In addition, the image frame processed in the camera module 241 may be stored in the memory 270, or may be transmitted outward through the wireless communication unit 220.

The microphone 242 receives external sound signals, for example, in a call mode, a recording mode, or a voice recognition mode, and processes the same into electrical voice data. The processed voice data may be converted and output so as to be transmitted to a mobile communication base station via the mobile communication module 222.

The sound output unit 250 may be realized in the form of a receiver that transfers a call sound to the user's ear, or in the form of a speaker 251 that outputs various alarm sounds or multimedia playback sounds.

In addition, the display unit 260 outputs information processed in the mobile terminal 200. For example, when the mobile terminal is in a call mode, the display unit displays a user interface (UI) or a graphic user interface (GUI) related to a call. In addition, when the mobile terminal 200 is in a video call mode or a photographing mode, the display unit displays a photographed and/or received image, a UI or a GUI.

The display unit 260 may include at least one selected from among an organic electro luminescence (EL) display, a liquid crystal display (LCD), a thin-film transistor liquid crystal display (TFT LCD), an organic light-emitting diode (OLED), a flexible display, and a three-dimensional (3D) display.

In an embodiment, the display unit 260 may include an organic EL display 261, and the organic EL display 261 may be a transparent organic EL display. That is, when the organic EL display 261 is used, an image is displayed on the organic EL display 261 when the organic EL display 261 is turned on, and the inside of a housing 101 may be visible through the organic EL display 261 when the organic EL display 261 is turned off when not in use. Here, the organic EL display 261 is not limited to being completely transparent, but may be transparent.

A touch panel 245 is disposed on the front side of the organic EL display 261 so as to cover the display plane of the organic EL display, or is disposed on the back side of the organic EL display 261. The mobile terminal 200 may be operated when, for example, a user finger or a user manipulation pen (stylus) touches the touch area of the organic EL display 261.

When the display unit 260 and a sensor that senses a touch operation (hereinafter, referred to as a "touch sensor") form a layered structure (hereinafter, referred to as a "touchscreen"), the display unit 260 may be used as an input device as well as an output device. In addition, the touch sensor may take the form of, for example, a touch film, a touch sheet or a touch pad.

The touch sensor may be configured to convert pressure applied to a specific region of the display unit 260 or variation in, for example, capacitance generated in a specific region of the display unit 260 into electrical input signals. The touch sensor may be configured to detect not only a touch position and a touch area, but also touch pressure. In addition, when the touch sensor senses a touch input, a signal corresponding thereto is transmitted to a touch controller. The touch controller processes the signal and then transmits corresponding data to the application processor 290. In this way, the application processor 290 may verify, for example, whether a touch has occurred in any region of the display unit 260.

In addition, the proximity sensor 231 may be located in an area inside the mobile terminal or near the touchscreen. The proximity sensor refers to a sensor that detects whether or not an object approaches a predetermined detection plane or whether or not an object is present near the predetermined detection plane using electromagnetic force or infrared light without mechanical contact.

Examples of the proximity sensor may include a transmissive photoelectric sensor, a direct-reflection-type photoelectric sensor, a mirror-reflection-type photoelectric sensor, a high-frequency oscillation proximity sensor, a capacitive proximity sensor, a magnetic proximity sensor, and an infrared proximity sensor. In addition, when the touchscreen is of an electrostatic type, the proximity sensor is configured to detect whether or not a pointer closely approaches based on variation in an electric field caused by the approach of the pointer. In this case, the touchscreen (touch sensor) may be classified as a proximity sensor.

Hereinafter, for convenience of description, an action in which the pointer is not in contact with the touchscreen, but is located close thereto such that the presence of the pointer above the touchscreen is recognized is referred to as "proximity touch", and an action in which the pointer is actually brought into contact with the touchscreen is referred to as "contact touch". The position at which the pointer performs "proximity touch" on the touchscreen means the position at which the pointer vertically corresponds to the touchscreen during the proximal touch.

The proximity sensor senses a proximity touch operation and a proximity touch pattern (for example, a proximity touch distance, a proximity touch direction, a proximity touch speed, a proximity touch time, a proximity touch position, and a proximity touch movement state). Information regarding the sensed proximity touch operation and the sensed proximity touch pattern may be output on the touchscreen.

The sensing unit 230 may be provided as a time-of-flight (ToF) sensor or an iris recognition sensor.

The ToF sensor is a sensor that is capable of calculating a distance to a subject by measuring the time taken until light emitted therefrom is reflected by the subject. In addition, the ToF sensor may include a light source, a sensing unit, and a controller.

The light source emits light to subjects. For example, the light source may use a device that enables high speed modulation such as, for example, an LED. The light emitted from the light source may be modulated light that is modulated to a high-frequency pulse of about 20 MHz. The light source may continuously emit light.

The light source may emit light when receiving a light source control signal (LSCS) from the controller. The emitted light is reflected by the subjects.

The sensing unit may sense the light reflected from the subjects and generate a distance data signal (DDS), which is an electrical signal. Specifically, the sensing unit may calculate the distance data signal (DDS) based on a difference value between the time at which the light is emitted from the light source and the time at which the light reflected from the subjects is detected.

The sensing unit may transmit the distance data signal (DDS) to the controller and may receive a view angle control signal (VACS). The sensing unit adjusts a view angle based on the view angle control signal (VACS).

The controller may receive the distance data signal (DDS) from the sensing unit and may generate the view angle control signal (VACS). The controller may include a view angle control circuit. The view angle control signal may generate the view angle control signal (VACS) by processing the distance data signal (DDS).

The iris recognition sensor may include an iris information recognizer, which reads user iris information and converts the same into an electrical signal to thereby output the electrical signal, a memory in which previously input rightful user iris information is stored, and a controller, which compares the user iris information obtained from the recognizer with the iris information stored in the memory to determine whether the two coincide with each other, and then determines whether or not to allow the user to use the cellular phone based on the result.

Here, the iris information recognizer may include a camera module, which forms digital image information regarding the user's iris, an iris extractor, which determines whether an image formed by the camera module has characteristics suitable for iris information extraction and extracts only an iris image from the image, and a digital signal processor, which performs wavelet conversion of the iris image to produce an iris characteristic code.

The camera module is a small camera mounted in the mobile terminal and needs to have a zoom-in function, unlike a common small camera, in order to attain sufficient image quality for iris recognition. Because an image captured by the camera module includes the entire figure around the eye as well as the iris, the iris extractor needs to isolate the iris from the image captured by the camera module. To this end, the iris extractor first inspects whether an image having sufficient quality for iris recognition is acquired. When the image quality is insufficient, the iris extractor notifies the controller so as to prompt a user to reattempt the capture of the image. When the quality of the image is sufficient, the iris extractor extracts only an iris area from the image, which shows the entire figure around the eye, and extracts the characteristics of the iris by investigating variation in the grayscale value of an iris pattern from the image that shows the extracted iris area. The characteristics of the iris acquired as described above are transmitted to the digital signal processor (DSP). Then, the DSP performs wavelet conversion on the characteristics of the iris, thereby producing a characteristic code.

The produced characteristic code may be transmitted to the controller, and the controller may perform comparison of the characteristic code. The controller, which has received the characteristic code from the DSP, compares the received characteristic code with a characteristic code stored in the memory. The characteristic code stored in the memory is previously input by an authorized user via iris recognition. Here, the memory may be, for example, an electrically erasable programmable read-only memory (EEPROM).

The memory 270 may store programs for the operation of the application processor 290, and may temporarily store input or output data, for example, a phonebook, messages, still images, and moving images. The memory 270 may store data regarding vibration and sound of various patterns output when a touch is input to the touchscreen.

In addition, the memory 270 may include at least one type of storage medium selected from among a flash memory, a hard disc, a multimedia micro card, and a card-type memory (e.g. an SD or XD memory), a random access memory (RAM), a static random access memory (SRAM), a read only memory (ROM), an electrically erasable programmable read only memory (EEPROM), a programmable read only memory (PROM), a magnetic memory, a magnetic disc, and an optical disc. In addition, the mobile terminal 200 may operate in relation with a web storage that performs a storage function of the memory 270 in the Internet.

Meanwhile, the user input unit 280 generates input data by which the user controls the operation of the terminal. The user input unit 280 may include, for example, a keypad, a dome switch, a touchpad (static pressure/electrostatic), a jog wheel, or any other switch.

The application processor (AP) 290 is generally a system-on-a-chip (SoC) device in which various peripheral circuits are integrated in a single package, and controls the general operation of the mobile terminal. For example, the application processor performs control and processing related to, for example, voice calls, data communication, and video calls. The application processor 290 may include a multimedia module for multimedia playback. The multimedia module may be implemented in the application processor 290, or may be implemented separately from the application processor 290.

In addition, the application processor 290 may perform pattern recognition processing for enabling writing input or drawing input, performed on the touchscreen, to be recognized as letters and images.

In addition, the application processor includes many interface circuits such as, for example, interfaces for connection of peripheral devices such as, for example, a communication-related device, the camera module 241, and the touch panel 245.

In addition, the application processor 290 reads programs stored in the memory 270 and performs a process for realizing various functions of the mobile terminal. For example, the application processor 290 reads an operating system (OS) program from the memory 270 to thereby execute the same, and also executes an application that operates based on the above-described OS program. In addition, the application processor 290 may execute various processes according to programs applied to the application processor 290.

The interface unit 295 serves as a passage for all external devices that are connected to the mobile terminal 200. The interface unit 295 may receive data from an external device, may receive a voltage to transmit the same to respective elements inside the mobile terminal 200, or may allow data inside the mobile terminal 200 to be transmitted to an external device. For example, the interface unit 295 may include a wired/wireless headset port, an external charger port, a wired/wireless data port, a memory card port, a port for connection of a device having an identification module, an audio input/output (I/O) port, a video input/output (I/O) port, and an earphone port.

The identity module is a chip in which various pieces of information for authorizing the user of the mobile terminal 200 are stored, and may include, for example, a user identity module (UIM), a subscriber identity module (SIM), or a universal subscriber identity module (USIM). A device having such an identification module (hereinafter referred to as an "identification device") may be manufactured in a smart card format. Accordingly, the identification device may be connected to the mobile terminal 200 via a port.

The camera module 241 according to the present embodiment includes a display unit, a proximity sensor, a photographing lens, and a controller.

The camera module 241 may process an image frame such as, for example, a still image or a moving image, acquired by an image sensor in a video call mode or in a photographing mode. The processed image frame may be displayed on the display unit 260. In addition, the organic EL display 261 of the display unit 260 displays various images according to the process in the application processor 290. The images displayed on the organic EL display 261 include, for example, a user interface image by which the user gives an operation instruction to the mobile terminal, a still image and a moving image. In addition, the still image includes a photographed image of a subject acquired by the photographing function of the camera module 241, and the moving image includes, for example, a preview image formed by photographing a subject so that the subject is recognizable at the point of photographing time.

In addition, the proximity sensor 231 may be a sensor that senses that an object to be sensed closely approaches the mobile terminal in a non-contact manner, and may sense that the user has approached the display unit within a predetermined distance. In addition, the controller may drive the display unit when receiving the amount of light emitted from by the light-emitting unit and the amount of light received by the light-receiving unit from the proximity sensor.

In addition, the controller may be provided as the application processor 290 that controls the general operation of the mobile terminal. The controller may perform control to cause the display unit to be in a use state when the proximity sensor does not sense that the user has approached the display unit within a predetermined distance, and may perform control to cause the display unit to be in a non-use state when the proximity sensor senses that the user has approached the display unit within a predetermined distance. Here, the proximity sensor 231 senses the approach of the user when the user has approached the proximity sensor within a predetermined distance at which the proximity sensor may sense an object, and transmits a sensing notification signal, which indicates that the approach of the user is sensed, to the application processor 290. When the application processor 290 receives the sensing notification signal from the proximity sensor, the application processor 290 turns off the organic EL display 261.

Meanwhile, the photographing lens may be disposed close to the proximity sensor to assist in the photographing function of the camera module.

In addition, the camera module 241 may further include an input unit, into which whether or not the display unit is to be used is input. The input unit may be provided as a switching button. In addition, when the switching button is operated to thereby transmit a switching signal, the application processor 290 may perform switching of the display unit between the use state and the non-use state in response to the switching signal.

Figure 3:
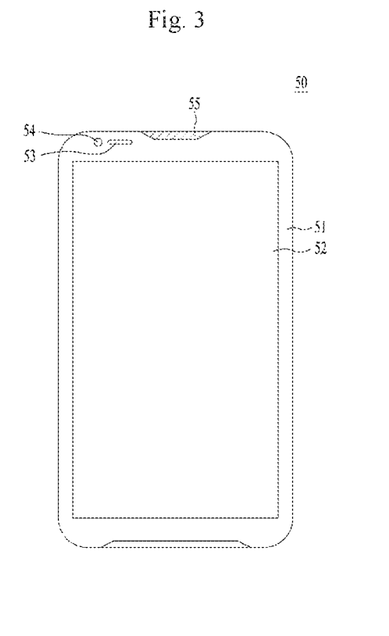
FIG. 3 is a plan view illustrating a conventional mobile terminal.

FIG. 3 is a plan view illustrating a conventional mobile terminal.

Referring to FIG. 3, in a conventional mobile terminal 50, a display 52 is disposed on a housing 51 and a cover unit 55 is disposed on the center of the upper end of the housing 51 to protect a sound output unit (not illustrated). In addition, a proximity sensor 53 and a photographing lens 54 of a camera module may be disposed parallel to each other at positions close to the cover unit 55.

With the arrangement of components described above, in order to prevent infrared light reflection and diffuse reflection caused during the operation of the proximity sensor 53, which includes a transmitter configured to transmit infrared light and a receiver configured to sense reflected infrared light, a black print layer is layered on the housing 51 at a position that corresponds to the proximity sensor 53. In this case, a white mobile terminal has difficulty in realizing an aesthetically pleasing design.

In addition, because the transmitter and the receiver of the proximity sensor 53 are disposed close to each other, crosstalk occurs due to internal diffuse reflection.

Figure 4:
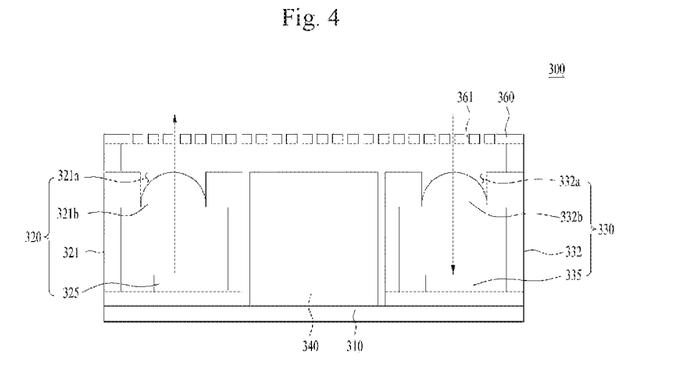
FIG. 4 is a cross-sectional view illustrating the configuration of a proximity sensor included in a camera module according to an embodiment.
Figure 5:
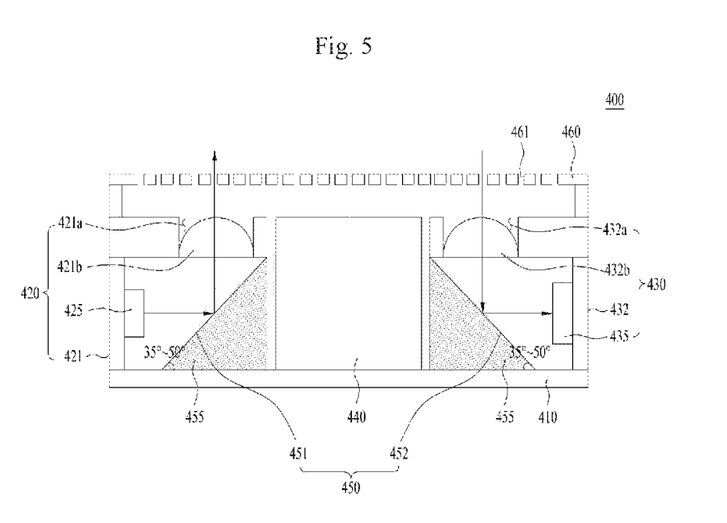
FIG. 5 is a cross-sectional view illustrating the configuration of a proximity sensor included in a camera module according to an embodiment.
Figure 6:
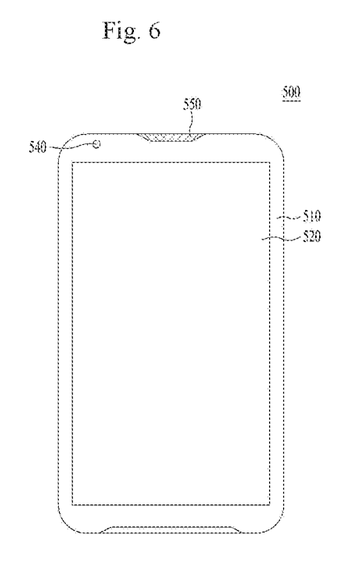
FIG. 6 is a plan view illustrating a mobile terminal according to an embodiment.

FIGS. 4 and 5 are cross-sectional views illustrating the configuration of a proximity sensor included in a camera module according to embodiments, and FIG. 6 is a plan view illustrating a mobile terminal according to an embodiment.

Referring to FIGS. 4 to 6, the mobile terminal according to the present embodiment includes a housing, a substrate, a sound output unit, a display unit, a camera module, and a cover unit.

The housing 510, which defines the external appearance of the mobile terminal 500, may be formed by injection molding a synthetic resin, or may be formed of a metal such as, for example, stainless steel (STS) or titanium (Ti).

In addition, the substrate may be disposed in the space defined inside the housing 510, and various electronic elements may be mounted on the substrate.

In addition, the sound output unit 340 or 440 and a light-emitting unit 320 or 420 and a light-receiving unit 330 or 430 of a proximity sensor may be seated on the substrate. Here, the configuration of the proximity sensor according to the present embodiment will be described below.

As illustrated in FIG. 4, the proximity sensor 300 includes a substrate 310, the light-emitting unit 320, the light-receiving unit 330, and a cover unit 360.

The substrate 310 may be a flexible printed circuit board (FPCB) on which a pattern is printed to enable a surface mounting technology (SMT) process.

Meanwhile, the light-emitting unit 320 and the light-receiving unit 330 may be disposed on the substrate 310, and may be spaced apart from each other with the sound output unit 340 of the mobile terminal interposed therebetween.

The light-emitting unit 320 may include a first body 321 configured to support the light-emitting unit 320, an infrared light-emitting diode 325, and a first lens 321b. The infrared light-emitting diode 325 may be die-bonded to the lower end surface of the first body 321. A first hole 321a may be formed in the upper end surface of the first body 321, and the first lens 321b may be inserted into the first hole 321a to control the angle of emission of light.

The light-receiving unit 330 may include a second body 332 configured to support the light-receiving unit 330, a photodiode 335, and a second lens 332b. In addition, the photodiode 335 may be die-bonded to the lower end surface of the second body 332. A second hole 332a may be formed in the upper end surface of the second body 332, and the second lens 332b may be inserted into the second hole 332a to control the angle of incidence of light.

In addition, the cover unit 360 may be disposed above the light-emitting unit 320, the light-receiving unit 330 and the sound output unit 340. Here, the cover unit 360 may include a lattice hole 361 to allow the light emitted from the light-emitting unit 320 and the light to be introduced into the light-receiving unit 330 to pass through the lattice hole 361. Accordingly, the amount of light emitted from the light-emitting unit 320 and the amount of light received by the light-receiving unit 330 may be increased, compared to those in the conventional proximity sensor.

Considering the configuration of the proximity sensor according to a further embodiment, as illustrated in FIG. 5, the proximity sensor 400 includes a substrate 410, the light-emitting unit 420, the light-receiving unit 430, a reflector 450, and a cover unit 460.

The substrate 410 may be a flexible printed circuit board (FPCB) on which a pattern is printed to enable a surface mounting technology (SMT) process.

Meanwhile, the light-emitting unit 420 and the light-receiving unit 430 may be disposed on the substrate 410, and may be spaced apart from each other with the sound output unit 440 of the mobile terminal interposed therebetween.

The reflector 450 may be provided on the light-emitting unit 420 and the light-receiving unit 430. The reflector 450 may include a first reflecting plane 451, which is disposed on the light-emitting unit 420 to refract the light emitted from the light-emitting unit 420, and a second reflecting plane 452, which is disposed on the light-receiving unit 430 to refract the light introduced into the light-receiving unit 430.

The light-emitting unit 420 may include a first body 421 configured to support the light-emitting unit 420, an infrared light-emitting diode 425, and a first lens 421b.

Here, a portion of the first body 421 is filled with a molding material 455. The molding material 455 may be located between the first body 421 and the lower end surface of the first reflecting plane 451. In addition, the molding material 455 may be disposed to support the first reflecting plane 451 and may fill the inside of the first body 421 so as to form a slope. Here, the first reflecting plane 451 may be provided along the slope. As such, the infrared light-emitting diode 425 may be die-bonded to the inner side surface of the first body 421 so as to face the first reflecting plane 451 disposed on one side of the first body 421.

In addition, because the substrate 410 extends to the inner side surface of the first body 421 on which the infrared light-emitting diode 425 is disposed, the substrate 410 and the infrared light-emitting diode 425 may be electrically connected to each other.

In addition, a first hole 421a may be formed in the upper end surface of the first body 421, and the first lens 421b may be inserted into the first hole 421a to control the angle of emission of light.

The light-receiving unit 430 may include a second body 432 configured to support the light-receiving unit 430, a photodiode 435, and a second lens 432b. In addition, a portion of the second body 432 is filled with a molding material 455. The molding material 455 may be located between the second body 432 and the lower end surface of the second reflecting plane 452. In addition, the molding material 455 may be disposed to support the second reflecting plane 452 and may fill the inside of the second body 432 so as to faun a slope. Here, the second reflecting plane 452 may be provided along the slope. As such, the photodiode 435 may be die-bonded to the inner side surface of the second body 432 so as to face the second reflecting plane 452 disposed on one side of the second body 432.

In addition, because the substrate 410 extends to the inner side surface of the second body 432 on which the photodiode 435 is disposed, the substrate 410 and the photodiode 435 may be electrically connected to each other.

In addition, a second hole 432a may be formed in the upper end surface of the second body 432, and the second lens 432b may be inserted into the second hole 432a to control the angle of introduction of light.

In addition, the first reflecting plane 451 may collect light from the infrared light-emitting diode 425, which is disposed on the side surface of the first body 421, to the top of the light-emitting unit 420, and may adjust the angle at which light spreads. In addition, the second reflecting plane 452 may collect light to the photodiode 435, which is disposed on the side surface of the second body 432, and may adjust the angle at which light spreads.

As described above, in order to increase the amount of light emitted from the infrared light-emitting diode 425 and the amount of light introduced into the photodiode 435, the first reflecting plane 451 and the second reflecting plane 452 may have an inclination angle ranging from 35 degrees to 50 degrees relative to the substrate 410. However, the inclination angle of the first reflecting plane 451 and the second reflecting plane 452 may be changed based on the shape and size of the first body 421 and the second body 432 and the positions at which the infrared light-emitting diode 425 and the photodiode 435 are disposed.

In addition, although the first reflecting plane 451 and the second reflecting plane 452 may be formed of at least one of acryl and polycarbonate, they may be formed of any other material capable of reflecting light such as, for example, a reflective metal such as gold (Au) or reinforced glass.

Meanwhile, the cover unit 460 may be disposed above the light-emitting unit 420, the light-receiving unit 430 and the sound output unit 440. Here, the cover unit 460 may have a lattice hole 461 to allow the light emitted from the light-emitting unit 420 and the light to be introduced into the light-receiving unit 430 to pass through the lattice hole 461. Accordingly, the amount of light emitted from the light-emitting unit 420 and the amount of light received by the light-receiving unit 430 may be increased, compared to those in the conventional proximity sensor.

Referring to FIG. 6, the display unit 520, the photographing lens 540 of the camera module, and the cover unit 550 configured to protect a speaker may be disposed on the housing 510.

The display unit 520 may occupy most of the front surface of the housing 510, and for example, a user input unit or a microphone may be further disposed.

Meanwhile, a camera module is disposed in the space inside the housing 510. The camera module includes a proximity sensor, which includes a light-emitting unit and a light-receiving unit disposed at opposite sides of the sound output unit to sense whether the user has approached the display unit within a predetermined distance, and a controller, which is configured to drive the display unit when receiving the amount of light emitted from the light-emitting unit and the amount of light received by the light-receiving unit from the proximity sensor. In addition, the photographing lens 540 of the camera module is disposed on the front surface of the housing 510, and the cover unit 550 is disposed close to the photographing lens 540. Here, the cover unit 550 may be located above the sound output unit and the light-emitting unit and the light-receiving unit of the proximity sensor, which are mounted in the space inside the housing 510. In addition, the light-emitting unit and the light-receiving unit of the proximity sensor are disposed at opposite sides of the sound output unit, and the cover unit 550 is provided in the longitudinal direction in which the light-emitting unit, the light-receiving unit and the sound output unit are arranged. Here, the cover unit 550 may have a length determined such that opposite edges of the cover unit 550 correspond respectively to positions at which the light-emitting unit and the light-receiving unit are located. Accordingly, because the area in which the proximity sensor including the light-emitting unit and the light-receiving unit is disposed is not exposed from the housing 510, the mobile terminal may be provided with a simple and aesthetically pleasing design regardless of the color of the housing thereof.

In addition, the cover unit 550 is provided with a lattice hole.

As described above, because a light-emitting unit and a light-receiving unit of a proximity sensor are disposed respectively at opposite sides of a sound output unit, crosstalk due to internal diffuse reflection may be prevented. In addition, because the amount of light emitted from the proximity sensor and the amount of light received by the proximity sensor is increased by allowing light, which is introduced into a light source of the light-emitting unit and the light-receiving unit of the proximity sensor to pass through a lattice hole of a cover unit, the performance of the proximity sensor may be increased.

Although the embodiments have been described above in detail with reference to the accompanying drawings, it will be apparent to those skilled in the art that the embodiments described above is not limited to the embodiments described above, and various substitutions, modifications, and alterations may be devised within the spirit and scope of the embodiments. Accordingly, various embodiments disclosed here are not intended to limit the technical sprit of the disclosure, and the scope of the technical sprit of the disclosure is not limited by the embodiments. Accordingly, the disclosed embodiments are provided for the purpose of description and are not intended to limit the technical scope of the disclosure, and the technical scope of the disclosure is not limited by the embodiments. The range of the disclosure should be interpreted based on the following claims, and all technical ideas that fall within the range equivalent to the claims should be understood as belonging to the scope of the disclosure.

INDUSTRIAL APPLICABILITY

A camera module including a proximity sensor and a mobile terminal including the same according to embodiments may prevent crosstalk, and may increase the amount of light emitted from the proximity sensor and the amount of light received by the proximity sensor, whereby the camera module and the mobile terminal including the proximity sensor having increased performance may be realized.

The invention claimed is:

1. A proximity sensor comprising:
    a substrate;
    a light-emitting unit and a light-receiving unit disposed on the substrate so as to be spaced apart from each other;
    a spacing maintainer disposed between the light-emitting unit and the light-receiving unit;
    a reflector having a first reflecting plane configured to reflect light emitted from the light-emitting unit and a second reflecting plane configured to reflect light introduced into the light-receiving unit; and
    a cover unit disposed above the light-emitting unit, the light-receiving unit and the spacing maintainer, and the cover unit having a lattice hole,
    wherein the light-emitting unit includes:
        a first body configured to support the light-emitting unit;
        an infrared light-emitting diode provided to face the first reflecting plane that is disposed on one side of the first body; and
        a first lens disposed in a first hole that is formed in an upper end surface of the first body.

2. The proximity sensor according to claim 1, wherein a molding material is disposed between the first body and a lower end surface of the first reflecting plane.

3. The proximity sensor according to claim 1, wherein the substrate and the infrared light-emitting diode are electrically connected to each other via a first wire disposed between the substrate and the infrared light-emitting diode, and the first wire is coated with a light-transmissive resin.

4. The proximity sensor according to claim 1, wherein the first reflecting plane and the second reflecting plane have an inclination angle ranging from 35 degrees to 50 degrees relative to the substrate.

5. A proximity sensor comprising:
    a substrate;
    a light-emitting unit and a light-receiving unit disposed on the substrate so as to be spaced apart from each other;
    a spacing maintainer disposed between the light-emitting unit and the light-receiving unit;
    a reflector having a first reflecting plane configured to reflect light emitted from the light-emitting unit and a second reflecting plane configured to reflect light introduced into the light-receiving unit; and
    a cover unit disposed above the light-emitting unit, the light-receiving unit and the spacing maintainer, and the cover unit having a lattice hole,
    wherein the light-receiving unit includes:
        a second body configured to support the light-receiving unit;
        a photodiode provided to face the second reflecting plane that is disposed on one side of the second body; and
        a second lens disposed in a second hole that is formed in an upper end surface of the second body.

6. The proximity sensor according to claim 5, wherein a molding material is disposed between the second body and a lower end surface of the second reflecting plane.

7. The proximity sensor according to claim 5, wherein the substrate and the photodiode are electrically connected to each other via a second wire disposed between the substrate and the photo diode, and the second wire is coated with a light-transmissive resin.

8. The proximity sensor according to claim 5, wherein the first reflecting plane and the second reflecting plane have an inclination angle ranging from 35 degrees to 50 degrees relative to the substrate.

9. A proximity sensor comprising:
a substrate;
a light-emitting unit and a light-receiving unit disposed on the substrate so as to be spaced apart from each other;
a spacing maintainer disposed between the light-emitting unit and the light-receiving unit;
a reflector having a first reflecting plane configured to reflect light emitted from the light-emitting unit and a second reflecting plane configured to reflect light introduced into the light-receiving unit; and
a cover unit disposed above the light-emitting unit, the light-receiving unit and the spacing maintainer, and the cover unit having a lattice hole,
wherein the first reflecting plane and the second reflecting plane have an inclination angle ranging from 35 degrees to 50 degrees relative to the substrate.

10. A camera module comprising:
a display unit;
a proximity sensor including a substrate, a light-emitting unit and a light-receiving unit disposed on the substrate so as to be spaced apart from each other, a spacing maintainer disposed between the light-emitting unit and the light-receiving unit, a reflector having a first reflecting plane configured to reflect light emitted from the light-emitting unit and a second reflecting plane configured to reflect light introduced into the light-receiving unit, and a cover unit disposed above the light-emitting unit, the light-receiving unit and the spacing maintainer, and the cover unit having a lattice hole, the proximity sensor being configured to sense whether a user has approached the display unit within a predetermined distance;
a photographing lens disposed adjacent to the proximity sensor;
a controller configured to drive the display unit when receiving the amount of light emitted from the light-emitting unit and the amount of light received by the light-receiving unit from the proximity sensor; and
a touch sensor configured to convert pressure applied to a specific region of the display unit or variation in capacitance generated in a specific region of the display unit into electrical input signals,
wherein the light-emitting unit includes:
 a first body configured to support the light-emitting unit;
 an infrared light-emitting diode provided to face the first reflecting plane that is disposed on one side of the first body; and
 a first lens disposed in a first hole that is formed in an upper end surface of the first body.

11. The camera module according to claim 10, wherein the first reflecting plane and the second reflecting plane have an inclination angle ranging from 35 degrees to 50 degrees relative to the substrate.

12. A camera module comprising:
a display unit;
a proximity sensor including a substrate, a light-emitting unit and a light-receiving unit disposed on the substrate so as to be spaced apart from each other, a spacing maintainer disposed between the light-emitting unit and the light-receiving unit, a reflector having a first reflecting plane configured to reflect light emitted from the light-emitting unit and a second reflecting plane configured to reflect light introduced into the light-receiving unit, and a cover unit disposed above the light-emitting unit, the light-receiving unit and the spacing maintainer, and the cover unit having a lattice hole, the proximity sensor being configured to sense whether a user has approached the display unit within a predetermined distance;
a photographing lens disposed adjacent to the proximity sensor;
a controller configured to drive the display unit when receiving the amount of light emitted from the light-emitting unit and the amount of light received by the light-receiving unit from the proximity sensor; and
a touch sensor configured to convert pressure applied to a specific region of the display unit or variation in capacitance generated in a specific region of the display unit into electrical input signals,
wherein the light-receiving unit includes:
 a second body configured to support the light-receiving unit;
 a photodiode provided to face the second reflecting plane that is disposed on one side of the second body; and
 a second lens disposed in a second hole that is formed in an upper end surface of the second body.

13. The camera module according to claim 12, wherein the first reflecting plane and the second reflecting plane have an inclination angle ranging from 35 degrees to 50 degrees relative to the substrate.

* * * * *